Sept. 23, 1969  G. MUELLER  3,468,713
PROCESS AND PUMP FOR CIRCULATING FLUIDS OR GASES
Filed June 15, 1966
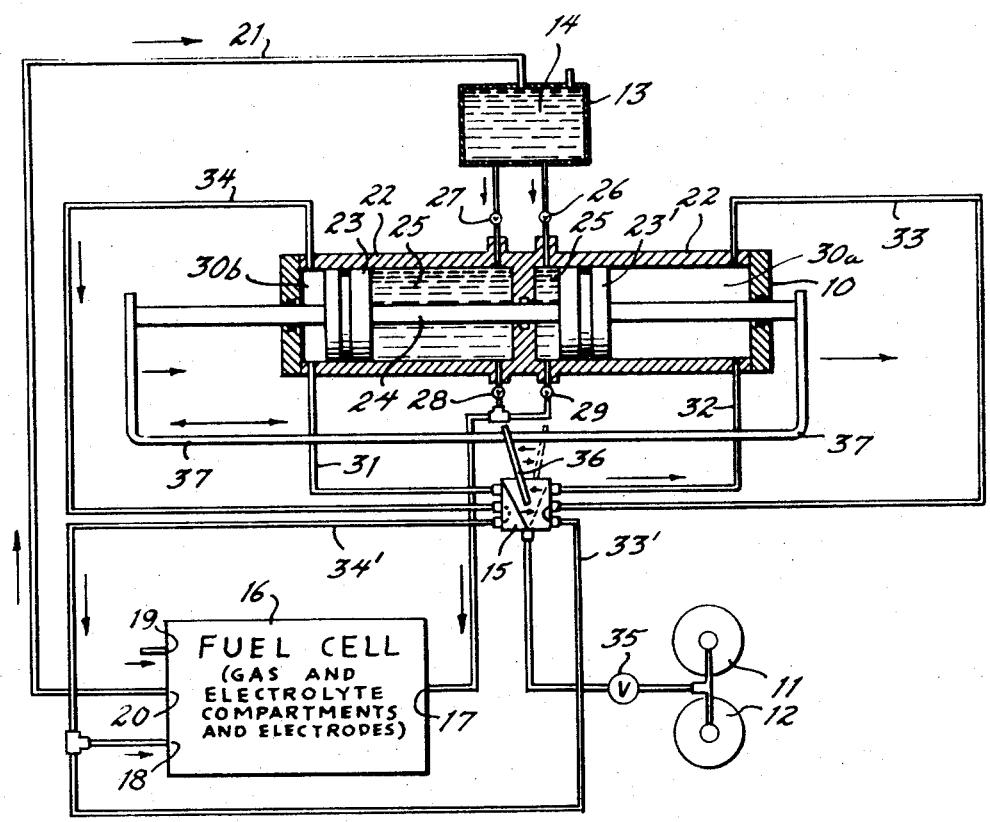
INVENTOR.
GERD MÜLLER
BY
ATTORNEY.

United States Patent Office 3,468,713
Patented Sept. 23, 1969

3,468,713
PROCESS AND PUMP FOR CIRCULATING FLUIDS OR GASES
Gerd Mueller, Obertshausen, Germany, assignor to Varta Aktiengesellschaft, Hagen, Westphalia, Germany, a corporation of Germany
Filed June 15, 1966, Ser. No. 557,759
Claims priority, application Germany, June 16, 1965, V 28,696
Int. Cl. H01m 27/12, 27/22
U.S. Cl. 136—86     16 Claims The present invention relates to a process for the circulation of fluids, such as gases or liquids, and more particularly to the circulation of the liquid electrolyte through fuel cells which convert energy electrochemically. The invention relates furthermore to a new pump which may be used with advantage in the practice of the process of the invention.

The use of electrically powered devices and especially of electrically powered pumps for the circulation of the fuel components and of the electrolyte through the fuel cell is not economical because it reduces the efficiency of the cells by the amount of electrical energy needed for the operation of the circulatory devices. Further losses of energy or reduction of the efficiency of the fuel cell result from an oversupply in the fuel cells of fuel over that actually consumed in the fuel cell at any given time.

It is therefore an object of the present invention to provide a process, which does not require electrically powered devices for the circulation of the fuel and electrolyte through the fuel cells. It is another object of the invention to provide a process which automatically controls and adjusts the supply of fuel, and advantageously of electrolyte, in the fuel cell in accordance with the actual consumption of fuel gas in the cell. Another object is the provision of a pump which does not require electrical power for its operation and which automatically controls and adjusts the fuel supply and the supply of electrolyte in relation to the actual consumption of fuel gas in the cell.

The objects of the invention are achieved by the utilization of the compression energy of the compressed fuel gas for the operation of the circulating pump or pumps and wherein the requirements of the pumps are controlled by the utilization of fuel gas.

The invention will be more readily understood by reference to the accompanying drawing which is a schematic representation of a fuel cell system comprising a gas driven pump. The term fluid is used herein to designate gases and liquids.

Examples of suitable pumps for the practice of the process of the invention are gas driven double piston pumps. One section each of the two cylinders of the pump is alternatingly and successively connected with the container comprising the compressed gas and with the fuel cell by the operation of a two-way valve which is controlled by the movement of the double piston assembly. The other section of each of the cylinders is connected over a pair of coordinated one-way valves with an electrolyte or gas supply tank, respectively, and with the electrolyte or gaseous fuel section of the fuel cell, respectively.

Since the pump does actually not consume any gas, but merely forwards it at a reduced pressure to the fuel cells, it is desirable that the pump is designed and dimensioned such that its gas capacity does not exceed the gas consumption of the fuel cell or cells supplied by the pump.

Referring to the accompanying drawing, a preferred system comprises as the major components pump 10, a container 11 with a supply of compressed gas 12, a closed tank 13 for the liquid electrolyte 14, a double action, two-way valve 15 and at least one fuel cell 16 with inlet 17 for the electrolyte, inlet 18 for a fuel gas, inlet 19 for another fuel gas and outlet 20 connecting over line 21 to electrolyte supply tank 13.

The pump 10 comprises double cylinders 22, in which pistons 23 and 23' are connected to each other by rod member or axle 24. The inner, adjoining connected sections 25 of the cylinders are connected over one-way valves 26 and 27, respectively, to the electrolyte supply tank 13 and over one-way valves 28 and 29, respectively, to the fuel cell, and are accordingly filled with electrolyte. The said one-way valves are designed as ball valves. The outer sections 30a and 30b of the cylinders are connected over lines 31 and 32 and lines 33 and 34, respectively, to two-way valve 15. The latter is connected over pressure valve 35 to the supply tanks 11 of compressed gas. Valves 26 and 27 are arranged such, that they open only at the suction stroke, while valves 28 and 29 open only upon the compression stroke, supplying the electrolyte at a relatively even flow to the fuel cell 16.

Valve 15 comprises control lever 36 which is actuated over frame member 37 directly by the reciprocation movement of the piston assembly. Lever 36 is slightly advanced at the rest positions of the pistons, so that the pump does not stop as long as the fuel cell consumes gas. Valve 15 is a double action valve which is on one hand adapted to connected alternatingly the gas supply tanks 11 with either line 31 or 32 and which on the other hand is adapted to connect and disconnect line 33 and 33' and line 34 and 34' so as to alternatingly open and close the connection of the cylinder sections 30a and 30b with the fuel cell.

Pressure valve 35 is adjusted to supply a pressure high enough to provide the fuel gas, with each stroke of the pump, at the gas outlet to the fuel cell at the desired operating pressure. Furthermore, the pressure at pressure valve 35 must be high enough to overcome also the resistance of flow of the electrolyte in the fuel cell. At a pressure, which just compensate for the resistance of flow of the electrolyte and which supplies in the above said manner the required operating pressure of the fuel gas in the cell, and neglecting the friction of the pump itself, the pump is at a rest position, i.e. at equilibrium. As soon as the gas pressure in the opposite cylinder section 30a or 30b is lowered by the consumption of gas by the fuel element, the pump starts to work slowly.

The operation of the pump becomes apparent from the foregoing. With pressure valve 35 properly adjusted, gas flows through valve 15 and through line 31 into the outer cylinder section 30b, moving piston 23 to the right. This results in the opening of valve 28, with the electrolyte contained in cylinder section 25 flowing into the fuel cell. At the same time valve 26 opens, drawing electrolyte from tank 13 into cylinder section 25 at the right. The gas contained in section 30a flows, under pressure, through line 33, valve 15 and line 33' into the fuel cell. When the stroke of piston 23 is completed, valve 15 has been switched to the opposite position with the gas now flowing through line 32 into the section 30a and electrolyte flowing through opened valve 29 into fuel cell 16, and through open valve 27 from tank 13 into left cylinder section 25 of the pump, and so forth.

In view of the unique design and arrangement of the pump, the pump is self-regulating. Depending on the amount of electrical energy taken from the fuel cell and accordingly, dependent on the fuel gas consumption, the number and frequency of the strokes of the pump vary in accordance with the needs and requirements. If no electrical energy is taken out, the pump stops working.

The pressure differential available for the operation of the pump is very appreciable. A freshly filled gas tank usually has a pressure of about 200 atmospheres. The pressure in the fuel cells is much lower and usually varies, depending on their construction and design, between 0.2–1.5 atmospheres gauge. The pump may be, accordingly, operated at varying pressures, which depend in part on its size, construction and design and on the pressure required or desired in the fuel cell. The pump pressures are usually within 1.5 to 4 atmospheres and preferably abut 1.1 to 3 atmospheres.

As shown in the foregoing, the process of the invention provides a continuous flow of electrolyte in the fuel cell system. The volume of the electrolyte and of the fuel gas delivered to the fuel cell is adjusted to the needs and controlled by the removal of electrical energy from the fuel cell. The new system and the process of the invention are therefore self-regulating, and only as much electrolyte as is needed, corresponding to the amount of fuel gas consumed, is supplied.

If desired, several pumps may be connected in series. One may also use the second fuel gas for the powering of the pump. It is also possible to circulate by the pump the second gas instead of the electrolyte. This latter arrangement is of particular advantage, if one uses air as the second gas, or, if it is desired to remove the reaction water contained in the gas by circulation of the gas. It is also possible to connect several, independent pumps, forwarding the same or different liquids or gases to a single or a plurality of fuel cells.

Fuel cells for the direct production of electrical energy from gaseous or fluid fuels which can be used in combination with the circulating pump of the invention are known. These cells comprise a fuel electrode and an oxygen electrode, which are spaced apart in an electrolyte bath. The electrodes are generally in the form of hollow bodies, such as hollow cylindrical bodies, and a gaseous oxidizing agent, such as oxygen, air or halogen is passed to the interior of the oxygen electrode, while a liquid or gaseous fuel is passed to the interior of the fuel electrode. The oxidizing gas and the fuel are adsorbed and de-adsorbed in the pores of the oxygen and fuel electrodes, respectively, leaving these electrodes in the form of ions with the electrode bodies remaining electrically charged. The ions may then recombine in the electrolyte solution.

For suplementary description of suitable fuel cell systems inclusive of electrodes and electrolytes that can be used with the pump reference is made to Fuel Cell Systems, Advances in Chemistry Series 47 A.C.S. 1965, and Fuel Cells (vols. 1 and 2) editor, George Young, Reinhold Publishing Corp. 1963 and such U.S. Patents as the following: 3,082,282, 2,912,478, 2,928,891, and 3,134,697, which all are incorporated herein by reference.

I claim:
1. A fuel cell system for circulating fluids which comprises a pump, a fuel cell, means for storing electrolyte and means for storing fuel gas under pressure, the pump comprising a double piston movable each within a cylinder and defining therein two cylinder sections, said sections being adapted to be alternatingly connected over valve means with the fuel gas storage means and the fuel cell, and said piston defining further two cylinder sections which are alternatingly connected over one-way valve means with the electrolyte storage means and the fuel cell, the valves being operated by the movement of the piston and the amount of fluid delivered to the fuel cell being automatically controlled by the amount of fuel consumed by the fuel cell.

2. A self-regulating pump in a fuel cell system, which pump comprises a double piston pump comprising two sections, in which one section each of the two cylinders is adapted to be alternatingly connected over a valve with a pressure tank containing a compressed gas and a fuel cell, said valve being controlled and operated by the movement of the double piston assembly of the pump, and wherein each of the remaining two cylinder sections is alternatingly connected over one pair of one-way valves with a fluid storage tank and with said fuel cell.

3. The pump of claim 2, in which said gas is a fuel gas.
4. The pump of claim 3, in which said fluid storage tank is an electrolyte storage tank, and wherein the said second cylinder sections are connected to the electrolyte section of said fuel cell.

5. The pump of claim 4 in combination with a fuel cell.

6. The process of circulating fluids in a system comprising a fuel cell and a double piston pump comprising 2 cylinders, each cylinder having outer and inner sections and container means for electrolyte which comprises urging gas into a first outer cylinder section, thereby moving the piston in the cylinder section thereby compressing the electrolyte in a first inner cylinder section and opening means to allow flow of electrolyte from said inner cylinder section into the fuel cell and concurrently opening means to allow flow of electrolyte from container means for electrolyte into a second inner cylinder section and urging gas from the second outer cylinder section into the fuel cell, and repeating these steps.

7. The process of claim 6 in which the volume of gas delivered to the fuel cell is automatically controlled by the amount of fuel gas consumed by the fuel cell.

8. The process of claim 6 in which the volume of electrolyte delivered to the fuel cell is automatically controlled by the amount of fuel gas consumed by the fuel cell.

9. The process of claim 6 in which a second gas is circulated by the pump.

10. A process for the circulation of fluids in fuel cells which consume fuel gas stored in compressed state and pump means to drive the fluid, which comprises
  driving the pump means by the energy of the compressed gas and regulating the output of the pump by means of the gas consumption of said fuel cell.

11. The process of claim 10 which comprises the circulating of the fluid through the fuel cell by means of a pump which is operatingly powered by the energy of the compressed gas which is used as a fuel in the said fuel cell.

12. The process of claim 10 in which the fluid circulated through the fuel cell is an electrolyte.

13. The process of claim 10 in which there is employed a double piston pump, in which one section each of the two cylinders is adapted to be alternatingly connected over a valve with the pressure tank containing a compressed gas, said valve being controlled and operated by the movement of the double piston assembly of the pump, and wherein each of the remaining two cylinder sections is alternatingly connected over one pair of one-way valves with an electrolyte storage tank and with said fuel cell.

14. The process of claim 11 in which the fluid electrolyte flows into the pump by gravitational force.

15. The process of claim 10 in which the fluid which is being circulated is an electrolyte.

16. The process of claim 15 in which the supplying of electrolyte is discontinued when the consumption of the reactant gas is also discontinued, and resuming the supplying of electrolyte when the consumption of reactant gas is resumed.

References Cited
UNITED STATES PATENTS

| | | | |
|---|---|---|---|
| 3,391,028 | 7/1968 | Vose | 136—86 |
| 3,152,016 | 10/1964 | Drushella | 136—86 |

WINSTON A. DOUGLAS, Primary Examiner

H. A. FEELEY, Assistant Examiner